US012380262B2

(12) United States Patent
Malkawi et al.

(10) Patent No.: US 12,380,262 B2
(45) Date of Patent: Aug. 5, 2025

(54) REPRESENTATIVE PART, METHODS OF DESIGNING REPRESENTATIVE PARTS, METHODS OF FORMING AND TESTING REPRESENTATIVE PARTS, AND METHODS OF QUALIFYING ADDITIVE MANUFACTURING SYSTEMS

(71) Applicant: Baker Hughes Oilfield Operations LLC, Houston, TX (US)

(72) Inventors: Ameen Moh'd Jehad Malkawi, Dhahran (SA); Naeem-ur Minhas, Dhahran (SA); Raghava Raju Lakhamraju, Dhahran (SA); Zahra Ridha Aleid, Dhahran (SA); Hussain Sharrofna, Dhahran (SA)

(73) Assignee: Baker Hughes Oilfield Operations LLC, Houston, TX (US)

( * ) Notice: Subject to any disclaimer, the term of this patent is extended or adjusted under 35 U.S.C. 154(b) by 1008 days.

(21) Appl. No.: 17/465,207

(22) Filed: Sep. 2, 2021

(65) Prior Publication Data

US 2023/0032861 A1 Feb. 2, 2023

Related U.S. Application Data

(60) Provisional application No. 63/227,613, filed on Jul. 30, 2021.

(51) Int. Cl.
*G06F 30/27* (2020.01)
*B22F 10/38* (2021.01)
(Continued)

(52) U.S. Cl.
CPC ............ *G06F 30/27* (2020.01); *B22F 10/385* (2021.01); *B22F 10/80* (2021.01); *B33Y 50/00* (2014.12);
(Continued)

(58) Field of Classification Search
CPC ...... G06F 30/27; G06F 30/20; G06F 2119/00; G06F 2113/10; G06N 20/00; B33Y 80/10;
(Continued)

(56) References Cited

U.S. PATENT DOCUMENTS

2020/0143009 A1 5/2020 Schmidt et al.
2020/0156323 A1 * 5/2020 Woytowitz ............. B33Y 50/02
(Continued)

FOREIGN PATENT DOCUMENTS

WO 2014/093084 A1 6/2014
WO 2019/190506 A1 10/2019

OTHER PUBLICATIONS

Sushmit Chowdhury, "Artificial Neural Network Based Geometric Compensation for Thermal Deformation in Additive Manufacturing Processes" (Year: 2016).*
(Continued)

*Primary Examiner* — John E Johansen
(74) *Attorney, Agent, or Firm* — Baker Hughes Patent Organization

(57) ABSTRACT

A method of forming a representative part correlating to an actual part. The method includes receiving an actual part design, analyzing the actual part design to identify one or more design elements, based on the one of more design elements; generating a representative part design incorporating the one or more design elements and having a differing overall shape comparative to the actual part design, and forming a representative part based on representative part design. A representative part correlating to an actual part includes one or more design elements of the actual part and a different overall shape relative to the actual part. A method of qualifying an additive manufacturing system or process for forming an actual part.

23 Claims, 15 Drawing Sheets

(51) Int. Cl.

| | |
|---|---|
| ***B22F 10/80*** | (2021.01) |
| ***B33Y 50/00*** | (2015.01) |
| ***B33Y 50/02*** | (2015.01) |
| ***G06F 30/20*** | (2020.01) |
| ***G06N 20/00*** | (2019.01) |
| *B22F 10/85* | (2021.01) |
| *B33Y 10/00* | (2015.01) |
| *B33Y 80/00* | (2015.01) |
| *G06F 113/10* | (2020.01) |

(52) U.S. Cl.
CPC .............. *B33Y 50/02* (2014.12); *G06N 20/00* (2019.01); *B22F 10/85* (2021.01); *B33Y 10/00* (2014.12); *B33Y 80/00* (2014.12); *G06F 30/20* (2020.01); *G06F 2113/10* (2020.01); *Y02P 10/25* (2015.11)

(58) Field of Classification Search
CPC ......... B33Y 50/00; B33Y 50/02; B33Y 10/00; B33Y 80/00; B22F 10/385; B22F 10/80; B22F 10/85; Y02P 10/25
USPC .............................................................. 703/6
See application file for complete search history.

(56) References Cited

U.S. PATENT DOCUMENTS

| | | | | |
|---|---|---|---|---|
| 2020/0309656 | A1 * | 10/2020 | Achten .................. | B33Y 10/00 |
| 2021/0182597 | A1 | 6/2021 | Andrew | |

OTHER PUBLICATIONS

Joe Micallef, "Beginning Design for 3D Printing", Chapters 2 and 6 (Year: 2015).*
Wei Liu, "A Decision-making Methodology Integrated in Product Design for Additive Manufacturing Process Selection" (Year: 2019).*
International Search Report for International Application No. PCT/US2022/074109, mailed Nov. 18, 2022, 3 pages.
International Written Opinion for International Application No. PCT/US2022/074109, mailed Nov. 18, 2022, 05 pages.

* cited by examiner

902

Summary

| | |
|---|---|
| Total surface area analyzed | 90074.81 mm^2 |
| Critical surface area (% of analyzed area) | 89691.46 mm^2 (99.57%) |
| Maximum deviation from target thickness | 88.88 mm |
| Average weighted thickness on critical area | 7.2 mm |
| Average weighted thickness on analyzed area | 7.2 mm |
| Number of critical faces | 495 Face(s) |
| Number of critical features | 1 |
| Minimum thickness on analyzed area | 0.25 mm |
| Maximum thickness on analyzed area | 88.98 mm |

Analysis Details

| Thickness range | Number of faces | Surface area | % of analyzed area |
|---|---|---|---|
| 0.1 mm to 22.32 mm | 155 | 81970.53 mm^2 | 91.00% |
| 22.32 mm to 44.54 mm | 252 | 7184.16 mm^2 | 7.98% |
| 44.54 mm to 66.76 mm | 37 | 266.44 mm^2 | 0.30% |
| 66.76 mm to 88.98 mm | 51 | 270.33 mm^2 | 0.30% |

| Critical features |
|---|
| implee_fan.stp |

Summary

| Total surface area analyzed | 90074.81 mm^2 |
|---|---|
| Critical surface area (% of analyzed area) | 74791.06 mm^2 (83.03%) |
| Maximum deviation from target thickness | 3 mm |
| Average weighted thickness on critical area | 4.3 mm |
| Average weighted thickness on analyzed area | 7.2 mm |
| Number of critical faces | 407 Face(s) |
| Number of critical features | 1 |
| Minimum thickness on analyzed area | 0.25 mm |
| Maximum thickness on analyzed area | 88.98 mm |

Analysis Details

| Thickness range | Number of faces | Surface area | % of analyzed area |
|---|---|---|---|
| 3 mm to 3.75 mm | 32 | 23450.56 mm^2 | 26.03% |
| 3.75 mm to 4.5 mm | 30 | 21146.72 mm^2 | 23.48% |
| 4.5 mm to 5.25 mm | 58 | 24827.1 mm^2 | 27.56% |
| 5.25 mm to 6 mm | 287 | 5366.68 mm^2 | 5.96% |

| Critical features |
|---|
| implee_fan.stp |

Summary

| | |
|---|---|
| Total surface area analyzed | 90074.81 mm^2 |
| Critical surface area (% of analyzed area) | 361.22 mm^2 (0.40%) |
| Maximum deviation from target thickness | 2.75 mm |
| Average weighted thickness on critical area | 2.33 mm |
| Average weighted thickness on analyzed area | 7.2 mm |
| Number of critical faces | 41 Face(s) |
| Number of critical features | 1 |
| Minimum thickness on analyzed area | 0.25 mm |
| Maximum thickness on analyzed area | 88.98 mm |

Analysis Details

| Thickness range | Number of faces | Surface area | % of analyzed area |
|---|---|---|---|
| 3 mm to 2.31 mm | 1 | 273.7 mm^2 | 0.30% |
| 2.31 mm to 1.63 mm | 1 | 24.56 mm^2 | 0.03% |
| 1.63 mm to 0.94 mm | 11 | 15.16 mm^2 | 0.02% |
| 0.94 mm to 0.25 mm | 28 | 47.81 mm^2 | 0.05% |

| Critical features |
|---|
| implee_fan.stp |

FIG. 9C

REPRESENTATIVE PART, METHODS OF DESIGNING REPRESENTATIVE PARTS, METHODS OF FORMING AND TESTING REPRESENTATIVE PARTS, AND METHODS OF QUALIFYING ADDITIVE MANUFACTURING SYSTEMS

CROSS-REFERENCE TO RELATED APPLICATION

This application claims the benefit under 35 U.S.C. § 119 (e) of U.S. Provisional Patent Application Ser. No. 63/227, 613, filed Jul. 30, 2021, for "REPRESENTATIVE PART METHODS OF DESIGNING REPRESENTATIVE PARTS, METHODS OF FORMING AND TESTING REPRESENTATIVE PARTS, AND METHODS OF QUALIFYING ADDITIVE MANUFACTURING SYSTEMS," the disclosure of which is hereby incorporated herein in its entirety by this reference.

TECHNICAL FIELD

This disclosure relates generally to representative parts including elements of an actual part. This disclosure further relates to methods of designing and testing representative parts to be formed via additive manufacturing processes and methods of evaluating additive manufacturing systems and processes by forming the representative parts.

BACKGROUND

Additive manufacturing, also known as 3D printing, is a transformative approach to industrial production that typically enables the creation of lighter, stronger parts and systems. Furthermore, typically, "additive manufacturing" refers to technologies that grow three-dimensional objects one layer at a time. Each successive layer bonds to the preceding layer of melted or partially melted material. Objects (e.g., parts or systems) are typically digitally defined by computer-aided-design (CAD) software that is used to create data packages that essentially "slice" the object into layers. This data package guides the path of a nozzle or print head as it deposits material upon the preceding layer. Alternatively, a laser or electron beam selectively melts or partially melts material in a bed of powdered material. As materials cool or are cured, the materials fuse together to form a three-dimensional object.

Additive manufacturing has further enabled more complex objects to be formed than were otherwise capable of being formed via conventional build processes and systems. Conventionally, additive manufacturing processes and systems are tested to determine a capacity of forming a given part or system by printing the actual part or system and then analyzing the part or system for quality. Additionally, typically, parts or systems are formed and then tested for performance, which can be time consuming and relatively expensive.

BRIEF SUMMARY

One or more embodiments of the present disclosure include a method of forming a representative part correlating to an actual part. The method may include receiving an actual part design, analyzing the actual part design to identify one or more design elements, based on the one of more design elements; generating a representative part design incorporating the one or more design elements and having a differing overall shape comparative to the actual part design; and forming a representative part based on representative part design.

Additional embodiments of the present disclosure include a representative part correlating to an actual part. The representative part may include one or more design elements of the actual part and a different overall shape relative to the actual part.

Some embodiments of the present disclosure include a method of qualifying an additive manufacturing system or process for forming an actual part. The method may include forming a representative part based on a representative part design via the additive manufacturing system or process, analyzing the representative part to determine a quality of the representative part responsive to determining that the quality of the representative part meets a threshold quality, qualifying the additive manufacturing system or process for forming the representative part; and responsive to determining that the quality of the representative part does not meet a threshold quality, disqualifying the additive manufacturing system or process for forming the actual part.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein:

FIGS. 9A-9C include tables showing example results of an analysis of an actual part according to one or more embodiments of the present disclosure.

DETAILED DESCRIPTION

Figure 1:
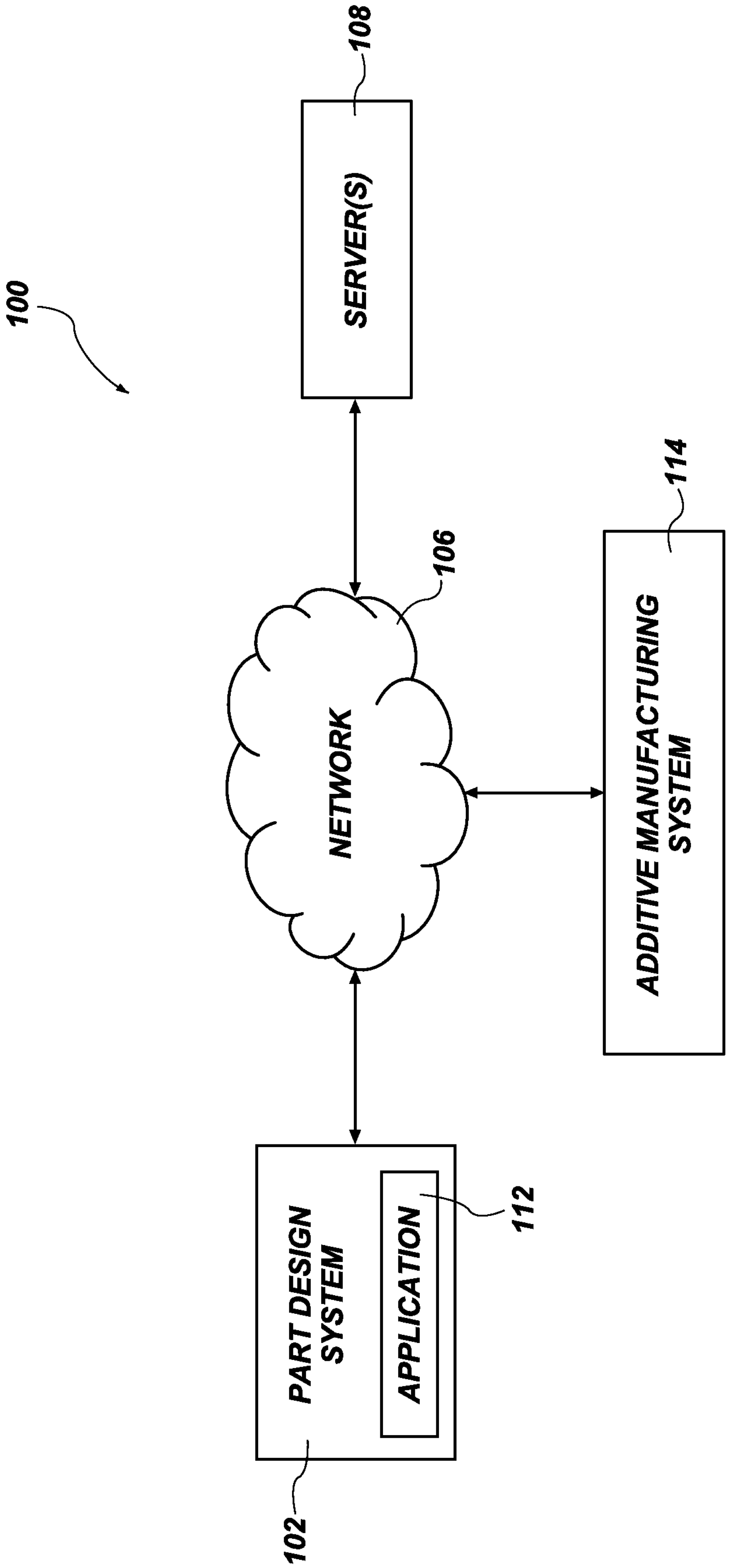
FIG. 1 is a schematic diagram of an environment within which a part design system may operate according to one or more embodiments of the present disclosure.

The illustrations presented herein are not actual views of any particular representative part, representative part design, additive manufacturing system, or any component of such, but are merely idealized representations, which are employed to describe the present invention.

As used herein, any relational term, such as “first,” “second,” “front,” “back,” etc., is used for clarity and convenience in understanding the disclosure and accompanying drawings, and does not connote or depend on any specific preference or order, except where the context clearly indicates otherwise.

As used herein, the terms “comprising,” “including,” “containing,” “characterized by,” and grammatical equivalents thereof are inclusive or open-ended terms that do not exclude additional, un-recited elements or method steps, but also include the more restrictive terms “consisting of,” “consisting essentially of,” and grammatical equivalents thereof.

As used herein, the term “may” with respect to a material, structure, feature, or method act indicates that such is contemplated for use in implementation of an embodiment of the disclosure, and such term is used in preference to the more restrictive term “is” so as to avoid any implication that other compatible materials, structures, features, and methods usable in combination therewith should or must be excluded.

As used herein, the term “configured” refers to a size, shape, material composition, and arrangement of one or more of at least one structure and at least one apparatus facilitating operation of one or more of the structure and the apparatus in a predetermined way.

As used herein, the singular forms following “a,” “an,” and “the” are intended to include the plural forms as well, unless the context clearly indicates otherwise.

As used herein, the term “and/or” includes any and all combinations of one or more of the associated listed items.

As used herein, the term “substantially” in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term “about” used in reference to a given parameter is inclusive of the stated value and has the meaning dictated by the context (e.g., it includes the degree of error associated with measurement of the given parameter).

Some embodiments of the present disclosure include methods of designing and forming a representative additive manufactured part or system (e.g., a representative part or prototype) that includes one or more features and/or complexities (e.g., design elements) of an actual part or system. The representative part may be smaller than the actual part and may have a different overall shape. The design of the representative part may be utilized in simulation, and the representative part may be utilized in inspection and testing.

One or more embodiments of the present disclosure include methods of designing and forming a universal representative part that include all of the features and/or complexities (e.g., design elements) of a plurality of actual parts or systems. Additionally, some embodiments of the present disclosure include qualifying additive manufacturing processes or systems to form actual parts by forming representative parts via the additive manufacturing processes or systems and determining a quality of formed representative parts. Moreover, “breakdown” points of the additive manufacturing processes or systems may be determined.

Furthermore, as is described in further detail herein, the representative part and representative part design of the present disclosure may reduce costs associated with computation analysis, testing, and eventual formation (e.g., production) of the actual part. Moreover, forming the representative part instead of the actual part via an additive manufacturing process or system may reduce required materials and time required to qualify the additive manufacturing process or system for making the actual part.

FIG. 1 illustrates a schematic diagram of an environment 100 in which a part design system may operate according to one or more embodiments of the present disclosure. As illustrated, the environment 100 includes a part design system 102, at least one server 108 (e.g., a cloud computing platform), a network 106, and one or more additive manufacturing systems 114.

As used herein, the term “part design system” refers to a system that determines and generates designs (e.g., three-dimensional models, CAD models, etc.) for a representative part that incorporates (e.g., includes) one or more design elements of an actual part while not including an entire geometry of the actual part. As used herein, the term “representative part” refers to a part or design that incorporates one or more design elements of an actual part or design of an actual part.

Furthermore, as used herein a “design element” may refer to one or more portions (e.g., critical design elements) of a part (e.g., an actual part) that is likely to fail during operation of the part and/or one or more portions of the part that are essential to the part maintaining operational integrity within an anticipated environment or when the part is subjected to an anticipated load. For example, the “design elements” of a part may refer to one or more of a thinnest section or portion, a thickest section or portion, a maximum curvature of a portion, a maximum overhang angle, a sharpest section or portion, or a smallest feature or portion of the part. Furthermore, the “design elements” of a part may refer structures of the part that are likely to cause stress concentrations (e.g., irregularities in the geometry or material of the part that cause an interruption to the flow of stress).

As is described in further detail below, the part design system 102 may analyze designs of actual parts and may generate one or more representative part designs (e.g., three-dimensional models and data packages that can be utilized by the one or more additive manufacturing systems 114) that incorporate one or more design elements of the actual part design, and as a result, the actual part. Subsequently, a representative part may be formed via the one or more additive manufacturing systems 114 according to a respective representative part design. The representative part may be smaller than the actual part and may take the place of (e.g., replace) the actual part in testing and inspection procedures.

In some embodiments, the part design system 102 may include one or more applications 112 and/or a databases including algorithms for receiving actual part designs, analyzing the actual part designs, and generating representative part designs based on analyses of the actual part designs. In particular, the part design system 102 may execute one or more applications for performing the functions of the various embodiments and processes described herein. In some embodiments, the application 112 may be local to the part design system 102. In other embodiments, the application 112 may be stored and/or at least partially operated via a cloud computing service (e.g., the at least one server 108).

The part design system 102, the at least one server 108, and the one or more additive manufacturing systems 114 may communicate via the network 106. In one or more embodiments, the network 106 includes a combination of cellular or mobile telecommunications networks, a public switched telephone network (PSTN), and/or the Internet or World Wide Web. The network 106, however, may include various other types of networks that use various communication technologies and protocols, such as a wireless local network (WLAN), a wide area network (WAN), a metropolitan area network (MAN), other telecommunication networks, or a combination of two or more of the foregoing networks. Although FIG. 1 illustrates a particular arrangement of the part design system 102, the at least one server 108, the one or more additive manufacturing systems 114, and the network 106, various additional arrangements are possible. For example, the part design system 102 may directly communicate with the one or more additive manufacturing systems 114, bypassing the network 106.

The part design system 102 may be any one or more of various types of computing devices. For example, the part design system 102 may include a mobile device such as a mobile telephone, a smartphone, a PDA, a tablet, or a laptop, or a non-mobile device such as a desktop, a computer cluster, or another type of computing device. Additional details with respect to the part design system 102 are discussed below with respect to FIG. 6.

The one or more additive manufacturing systems 114 may include any conventional additive manufacturing system. The one or more additive manufacturing systems 114 are described in greater detail below with reference to FIGS. 2 and 4.

Figure 2:
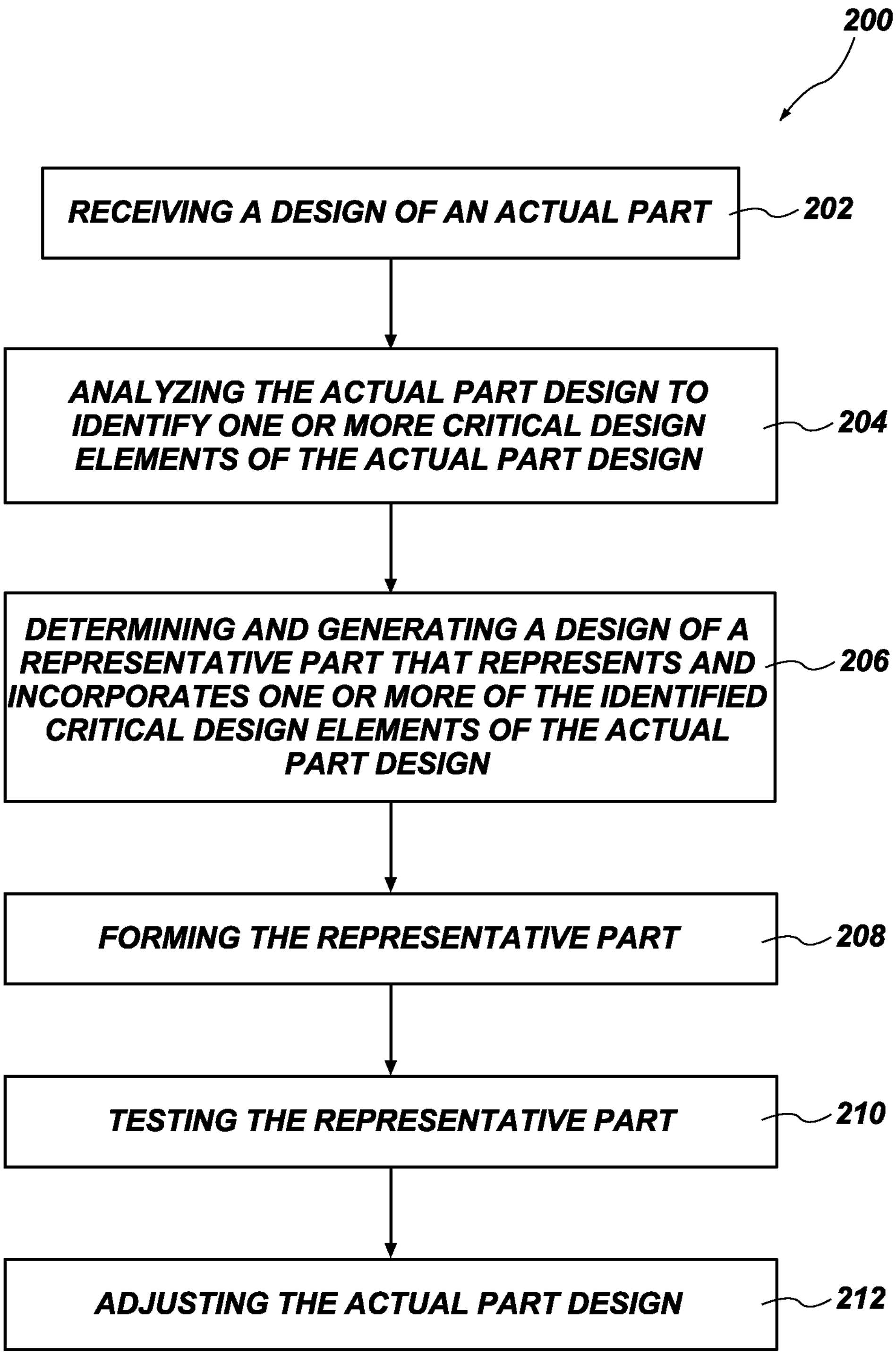
FIG. 2 shows a flow chart of a method of designing and testing a representative part that represents (e.g., correlates to) and incorporates (e.g., exhibits) one or more design elements of an actual part according to one or more embodiments of the present disclosure.

FIG. 2 is a flow chart of a method 200 of designing and testing a representative part that represents and incorporates (e.g., exhibits) one or more design elements of an actual part (e.g., an actual part of an earth-boring tool and/or drilling system). In some embodiments, the method 200 may include receiving a design of an actual part (e.g., an actual part of an earth-boring tool and/or drilling system), as shown in act 202 of FIG. 2. In one or more embodiments, the part design system 102 may receive the design of the actual part (also referred to herein as "actual part design") from one or more of a cloud computing platform, a user input, a database, an additive manufacturing system, an application, etc. The actual part design may include a three-dimensional model representing the geometrical shape and materials of the actual part. For example, the actual part design may include a data package that is typically utilized by an additive manufacturing system to form a part. Some embodiments include receiving a plurality of actual part designs. Throughout the disclosure, reference may be made to "an actual part design" or "the actual part design." However, the disclosure is no so limited; rather, a plurality of actual part designs may optionally be utilized and implemented in any embodiment described herein.

Responsive to receiving the actual part design, the method 200 may include analyzing the actual part design to identify one or more design elements of the actual part, as shown in act 204 of FIG. 2. For example, the part design system 102 may perform one or more analyses on the actual part design to identify any of the design elements (e.g., a thinnest section or portion, a thickest section or portion, a maximum curvature, a maximum overhang angle, a minimum overhang angle, a sharpest section or portion, or a smallest feature or portion of the actual part). Some embodiments include analyzing a plurality of actual part designs to identify the design elements of some or all of the plurality of actual part designs.

In some embodiments, the part design system 102 may analyze the actual part design to identify one or more design elements of the actual part via one or more machine learning techniques. For example, the part design system 102 may utilize one or more machine learning techniques and/or deep learning techniques to iteratively model and simulate performance of the actual part based on the actual part design to identify one or more design elements of the actual part.

In some embodiments, the machine learning and/or deep learning techniques may include one or more of regression models (e.g., a set of statistical processes for estimating the relationships among variables), classification models, and/or phenomena models. Additionally, the machine-learning techniques and/or deep learning techniques may include a quadratic regression analysis, a logistic regression analysis, a support vector machine, a Gaussian process regression, ensemble models, or any other regression analysis. Furthermore, in yet further embodiments, the machine-learning techniques and/or deep learning techniques may include decision tree learning, regression trees, boosted trees, gradient boosted tree, multilayer perceptron, one-vs-rest, Naïve Bayes, k-nearest neighbor, association rule learning, a neural network, deep learning, pattern recognition, or any other type of machine-learning.

In some embodiments, the part design system 102 may utilize historical data, feedback data, known physics models, and/or mechanics models to train the machine-learning models to match design elements (e.g., material compositions, external structures/geometry, and/or internal structures/geometry, etc.) with operational integrity and performance (e.g., durability, likelihood of failure, failure points, etc.) of the actual part within given applications (e.g., drilling processes). In other words, via the machine learning model techniques, the part design system 102 may learn correlations between input data (e.g., material compositions, external structures/geometry, and/or internal structures/geometry, etc.) and operational integrity and performance of the actual part. Put another way, the part design system 102 may learn the relationship between the actual part design and the performance of the modeled/simulated operational integrity and performance of the actual part. For example, as will be understood in the art, for a given set of input values (e.g., a given actual part design), the part design system 102 is expected to produce consistent and accurate output values (i.e., operation integrity and performance data). In particular, the machine learning models may be trained via supervised learning, as is known in the art. After a sufficient number of iterations, the machine learning models become trained machine-learning models. In some embodiments, the machine learning models may also be trained on historical data from previously designed and implemented actual parts. For example, the historical data may include data regarding operation integrity and performance of elements of the actual parts within an actual application.

Furthermore, based at least partially on the analyses of the actual part design via the one or more machine learning techniques, the part design system 102 may identify one or more design elements of the actual part design (and the actual part). As noted above, the one or more design elements of the actual part may include, for example, a thinnest section or portion, a thickest section or portion, a maximum curvature, a maximum overhang angle, a sharpest section or portion, or a smallest feature or portion of the actual part design (and the actual part).

Referring still to FIG. 2, the method 200 may further include, determining and generating a design of a representative part that represents and incorporates (e.g., exhibits)

one or more of the identified design elements of the actual part design, as shown in act 206 of FIG. 2. For example, the method 200 may include determining and generating a design of a representative part that represents and incorporates (e.g., exhibits) all of the identified design elements of the actual part design. In one or more embodiments, the part design system 102 may determine and generate the design of the representative part (also referred to herein as the "representative part design"). Furthermore, the part design system 102 may determine and generate the representative part design to include one or more design elements of the actual part design but not an entire geometry (e.g., shape) of the actual part design. For example, the representative part design may not include all elements and features of the actual part design. Additionally, in some embodiments, the representative part design may include a simplified design relative to the actual part design. Some embodiments include determining and generating a universal representative part that incorporates (e.g., exhibits) a plurality of identified design elements from a plurality of actual part designs. For example, the universal representative part may incorporate all of the identified design elements for a plurality of actual parts or systems. Throughout the disclosure, references is made to "a representative part" or "the representative part." However, any of the representative parts described herein may optionally or alternatively include a "universal representative part" representing multiple actual part designs and part, as described herein.

In some embodiments, the part design system 102 may determine and generate the representative part design utilizing one or more machine learning techniques. For example, the part design system 102 may utilize any of the machine learning techniques described above to determine and generate the representative part design. In some embodiments, the part design system 102 may determine and generate the representative part design to minimize an overall size of the representative part design while incorporating one or more identified design elements (e.g., a portion or all of the identified design elements). Furthermore, the part design system 102 may determine and generate the representative part design to orient the one or more identified design elements within the representative part design such that each of the one or more identified design elements may be subjected to appropriate testing (e.g., destructive testing or other testing) and inspection for the respective design element. For example, the part design system 102 may determine and generate the representative part design to orient the one or more identified design elements within representative part design such that the one or more identified design elements are accessible for anticipated testing and inspection. In view of the foregoing, in some embodiments, the part design system 102 may determine and generate the representative part design to orient the one or more identified design elements within the representative part design such that each of the one or more identified design elements may be subjected to appropriate testing while minimizing an overall size (e.g., physical size) of the representative part of the representative part design.

Moreover, as will be understood by one of ordinary skill in the art, in some instances, defects can occur in parts formed via additive manufacturing when relative large numbers of layers are stacked on each other (e.g., the part reaches relatively large heights). Accordingly, the part design system 102 may determine and generate the representative part design to include a height element (e.g., a tower) that reaches a same height as the actual part such that the height of the actual part is exhibited by the representative part.

Figure 3B:
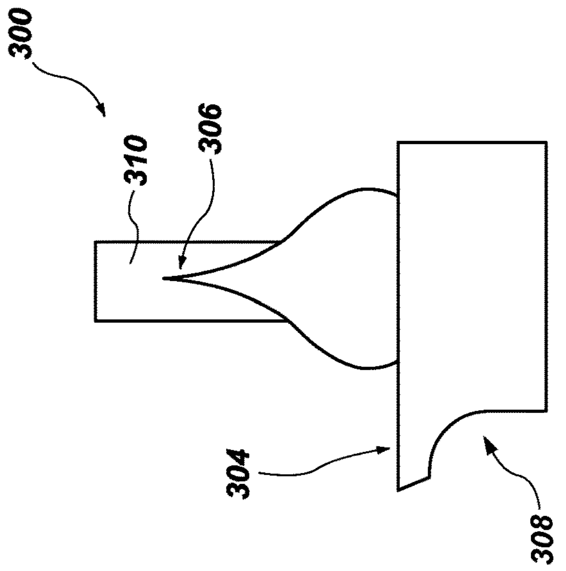
FIGS. 3A-3C depict various views of an example representative part design that may be designed by a part design system according to one or more embodiments of the present disclosure.
Figure 3A:
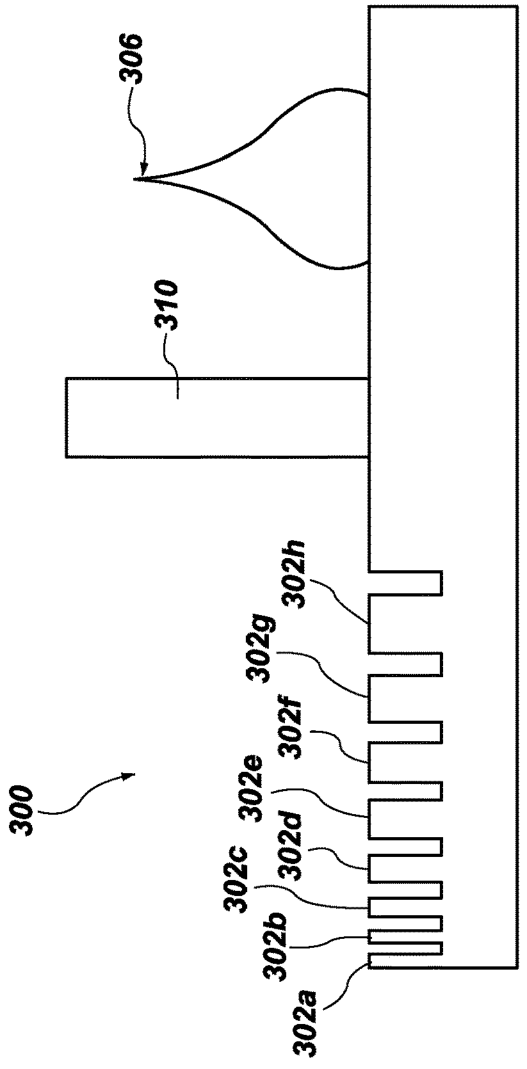
Figure 3C:
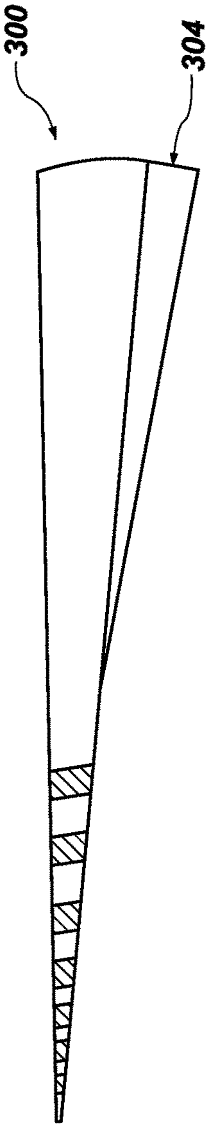

FIGS. 3A-3C depict various views of an example representative part design 300 that may be designed by the part design system 102 as described herein. For example, FIG. 3A shows a side view of a representative part design 300, FIG. 3B shows a front view of the representative part design 300, and FIG. 3C shows a top view of the representative part design 300. Referring to FIGS. 2-3C together, the representative part design 300 may include one or more design elements of one or more actual part designs. For example, the representative part design 300 may include one or more of a thinnest section or portion, a thickest section or portion, a maximum curvature, a maximum overhang angle, a sharpest section or portion, or a smallest feature or portion of one or more actual part designs (and actual parts). As a non-limiting example, the representative part design 300 of FIGS. 3A-3C includes smallest features 302*a*-302*h* of one or more actual part designs, an overhang portion 304 of the one or more actual part designs, a thinnest portion 306 of the one or more actual part designs, a maximum overhang angle 308 of the one or more actual part designs, a tower 310 reaching a maximum height of the one or more actual part designs, etc.

In some embodiments, the one or more design elements may include a set of elements (e.g., the smallest features) that gradually increase in size such that a range of a size of elements may be exhibited in the representative design. Likewise, the one or more design elements may include sets of elements or single elements that exhibit ranges of thicknesses, curvatures, overhang sizes, slopes, angles, etc.

In some embodiments, the representative part design 300 (e.g., a part represented in the representative part design 300) may be smaller in size (e.g., physical size) than the actual part design and may not generally correlate to same overall shape of the actual part design for which design elements are represented in the representative part design 300. For example, in one or more embodiments, an appearance of the representative part design 300 may not be immediately recognizable as correlating to the actual part design. As another non-limiting example, the overall shape of the representative part design 300 may be different than the shape (e.g., overall shape) of the actual part design.

Referring back to FIG. 2, upon determining and generating the representative part design, the method 200 may include building the representative part, as shown in act 208 of FIG. 2. In some embodiments, the method 200 may include forming the representative part via one or more additive manufacturing processes. As noted above, in some embodiments, forming the representative part comprises forming a universal representative part. As a non-limiting example, in one or more embodiments, the representative part and/or any element thereof may be formed via one or more additive manufacturing processes, such as, for example, binder jetting, stereolithography (SLA), sol-gel or liquid dispense methods, inkjet 3D printing, direct metal deposition, micro-plasma powder deposition, direct laser sintering, selective laser sintering, electron beam melting, electron beam freeform fabrication, fused deposition modeling, and other additive manufacturing processes. In some embodiments, each element (e.g., design element) of the representative part may be formed via a same additive manufacturing process. In other embodiments, one or more elements of the representative part may be formed via differing additive manufacturing processes. In some embodiments, an entirety of the representative part may be formed via a single additive manufacturing process and a single additive manufacturing system. In other embodiments, one or more elements of the representative part may be for via a first additive manufacturing process and a first additive manufacturing system, and one or more elements of the representative part may be for via a second additive manufacturing process and a second additive manufacturing system. Subsequently, the separately formed elements of the representative part may be assembled. An example additive manufacturing process is described below in regard FIG. 4.

In one or more embodiments, the part design system 102 may provide the data package representing the representative part design to one or more additive manufacturing systems (e.g., 3D printers) for forming the representative part. In additional embodiments, the part design system 102 may store the data package representing the representative part design in a database on one or more servers 108, which are accessible by the one or more additive manufacturing systems, and the data package representing the representative part design may be acquired (e.g., retrieved) by the one or more additive manufacturing systems for forming.

Subsequent to forming the representative part, the method 200 may include testing the representative part, as shown in act 210 of FIG. 2. For example, the method 200 may include subjecting the representative part of any conventional testing methods and procedures to which the actual part would typically be subjected. For instance, the method 200 may include subjecting the representative part to one or more of temperature testing, fracture and mechanical testing, toughness testing, fatigue testing, corrosion testing, residual stress management testing, visual non-destructive testing, ultrasonic non-destructive testing, radiography non-destructive testing, eddy current non-destructive testing, magnetic particle non-destructive testing, acoustic emission non-destructive testing, liquid penetrant non-destructive testing, leak testing, and/or any other suitable test. Furthermore, testing the representative part may include simulating performance of the representative part and/or representative part design.

In some embodiments, the method 200 may include subjecting the representative part of any conventional testing methods and procedures utilized to test the design elements included within the representative part for a given application. Additionally, in some embodiments, the testing methods to which the representative part is subjected may be at least partially determined from the design elements included within the representative part. Furthermore, the testing methods to which the representative part is subjected may be at least partially determined by an anticipated application of the actual part.

In some embodiments, testing and inspecting the representative part may include determining the mechanical properties of the design elements of the representative part. As a non-limited example, a relatively smaller element of design elements may cool faster during formation, which may affect the internal or external mechanical properties of the smaller element such that the internal mechanical properties of the smaller element are different relative to a larger element or core of the representative part. Furthermore, testing and inspecting the representative part may include inspecting external surfaces of the representative part to determine whether the design elements affected the external surfaces (e.g., made the external surfaces more rough due to (e.g., a curvature of the external surface)).

Furthermore, testing the representative part may include acquiring results (e.g., result data) from the testing. For example, the testing the representative part may include acquiring results via any conventional manner. Moreover, testing the representative part may include evaluating performance and operational integrity (e.g., durability, likelihood of failure, failure points, etc.) of the design elements of the actual part design included within the representative part.

Additionally, responsive to the testing and results of the representative part, the method 200 may include adjusting the actual part design, as shown in act 212 of FIG. 2. For example, responsive to the evaluated performance and operation integrity of the design elements of the representative design, the method 200 may include making adjustments to the design of one or more of the design elements of the actual part design. As a non-limiting example, responsive to a determination that a design element failed in response to the testing procedures, one or more of an external structure (e.g., a thickness, a radius of curvature, a shape, and/or a size), an internal structure, or a material composition of the design element of the actual part design may be adjusted. Furthermore, acts 204-212 of FIG. 2 may be repeated numerous times to optimize the actual part design for the anticipated application.

Embodiments of the representative part and the methods of forming the representative part to include design elements of an actual part design described herein may provide advantages. For example, as described herein, the representative part may be smaller in size than the actual part it represents and may replace typical sacrificial actual parts (i.e., actual parts that are sacrificed (e.g., destroyed) for testing purposes). In view of the foregoing, the representative part may require less material and may require less time to produce than the actual part. Accordingly, the representative part may cost less to produce and may reduce lead time relative to forming the actual part. Furthermore, by testing a representative part instead of an actual part, requirements to perform destructive testing on the actual part may be reduced and/or eliminated. Moreover, testing the representative part instead of the actual part may reduce simulation and inspection costs and time require for simulation and testing of the actual part. In some embodiments, a representative part may be manufactured along with each actual part for testing and for providing to a customer or user.

Moreover, because the representative part can provide data as to the material properties and performance of the actual part, utilizing the representative part to test performance of the actual part reduces an amount of information regarding to design of the actual part that has to be disclosed for testing purposes. In particular, by testing the representative part instead of the actual part, details regarding the actual part or design of the actual part can be withheld (e.g., remain confidential) while still ultimately obtaining and providing data regarding performance of the actual part. For instance, initial results (e.g., initial testing results) regarding performance of the actual part design may be provided to a user (e.g., customer) prior to forming (e.g., printing) the actual part.

Figure 4:
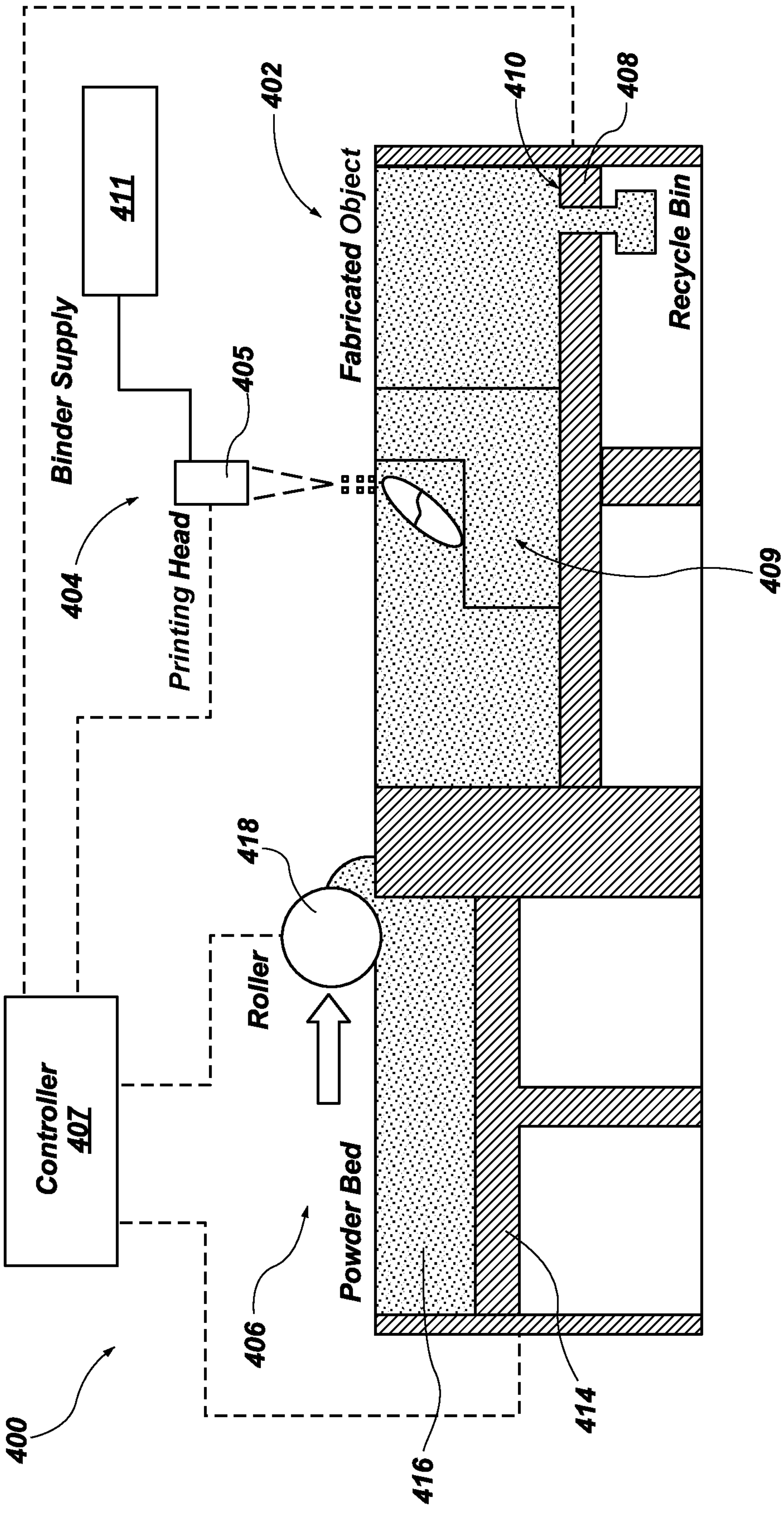
FIG. 4 is a schematic view of an additive manufacturing system according to one or more embodiments of the present disclosure.

For clarity and by way of example and not limitation, a description of an example additive manufacturing method by which one or more elements of the representative part may be formed is provided below with reference to FIG. 4. FIG. 4 is a schematic view of an additive manufacturing system 400 according to one or more embodiments of the present disclosure. In some embodiments, the additive manufacturing system 400 includes a build assembly 402, a binder deposition system 404, a source material assembly 406, and a controller 407. Each of the build assembly 402, the binder deposition system 404, and the source material assembly 406 may be operably coupled to the controller 407. The build assembly 402 may include a build platform 408, a build plate 410 disposed on an upper surface of the build platform 408 and for supporting a part 409 (e.g., the representative part) to be constructed, and one or more fasteners removably securing the build plate 410 to the build platform 408.

In some embodiments, the build platform 408 may include a piston, which translates in a vertical direction (e.g., a vertical Z axis) during part 409 formation. Furthermore, the build platform 408 may incrementally lower in a vertical direction during a part 409 printing process. For instance, the build platform 408 may include any conventional build platform known in the art.

The source material assembly 406 may include a material delivery platform 414, a source material 416, and a material applicator 418. In some embodiments, the material delivery platform 414 may include a piston, which translates in the vertical direction (e.g., the vertical Z axis), and the source material 416 may be disposed upon the piston. For instance, the material delivery platform 414 may translate upward in the vertical direction during a part printing process, and the material applicator 418 (e.g., a powder roller, a powder blade) may move source material 416 from on top of the material delivery platform 414 to the build assembly 402. For example, the material applicator 418 (e.g., a roller, a blade) may skim powder source material 416 from on top of the top of the material delivery platform 414 and may spread a layer over the build platform 408. For instance, the source material assembly 406 may include any conventional source material assembly 406 known in the art.

The binder deposition system 404 may include a printing head 405 and a binder supply 411. The printing head 405 deposits (e.g., jets) a binding agent onto the powder according to a part's geometry (e.g., one or more elements of the representative part). The binder deposition system 404 may direct the printing head 405 in the X and Y directions via conventional methods. For example, the binder deposition system 404 may include any conventional binder deposition system 404 known in the art. Subsequently, another layer of the source material 416 may be spread over the binding agent and the previous layer, and the process of spreading layers and depositing binding agent according to the part's geometry may be repeated to form layers of the part and, ultimately, form the part (e.g., one or more elements of the representative part) itself.

The controller 407 may include a processor, a memory, a storage device, an I/O interface, and a communication interface, which may be communicatively coupled by way of a communication infrastructure. In one or more embodiments, the processor includes hardware for executing instructions, such as those making up a computer program. The memory may be used for storing data, metadata, and programs for execution by the processor(s). The storage device includes storage for storing data or instructions. The I/O interface allows a user to provide input to, receive output from, and otherwise transfer data to and receive data from the additive manufacturing system 400. The communication interface can include hardware, software, or both. In any event, the communication interface can provide one or more interfaces for communication (such as, for example, packet-based communication) between the additive manufacturing system 400 and one or more other computing devices or networks. For example, the communication interface can provide one or more interfaces for communication (such as, for example, packet-based communication) between the additive manufacturing system 400 and part design system 102 and/or one or more servers 108 (e.g., cloud computing platforms)

In operation, the controller 407 may slice a three-dimensional model (e.g., the representative part design 300) into layers via a conventional process to create a two-dimensional image of each layer. Subsequently, the material applicator 418 may spread a thin layer of source material 416 (e.g., 0.1 mm thick layer of material) over the build plate 410 and the build platform 408. The binder deposition system 404 may deposit a binding agent on the layer of source material 416 to fuse or bond a first layer of material according to the two-dimensional image of the first layer. The build platform 408 then incrementally lowers (e.g., lowers by the same amount as the thickness of the layer of source material 416), and the process repeats until the entire (or at least a portion) of the three-dimensional model is created. For instance, the additive manufacturing system 400 may operate in a conventional manner.

Referring to FIGS. 1-4 together, the additive manufacturing system 400 may include one or more additive manufacturing systems in addition to or instead of a binder jetting system. For instance, the additive manufacturing system 400 may include additive manufacturing systems for performing one or more of stereolithography (SLA), sol-gel or liquid dispense methods, inkjet 3D printing, direct metal deposition, micro-plasma powder deposition, direct laser sintering, selective laser sintering, electron beam melting, electron beam freeform fabrication, fused deposition modeling, or other additive manufacturing processes.

Figure 5:
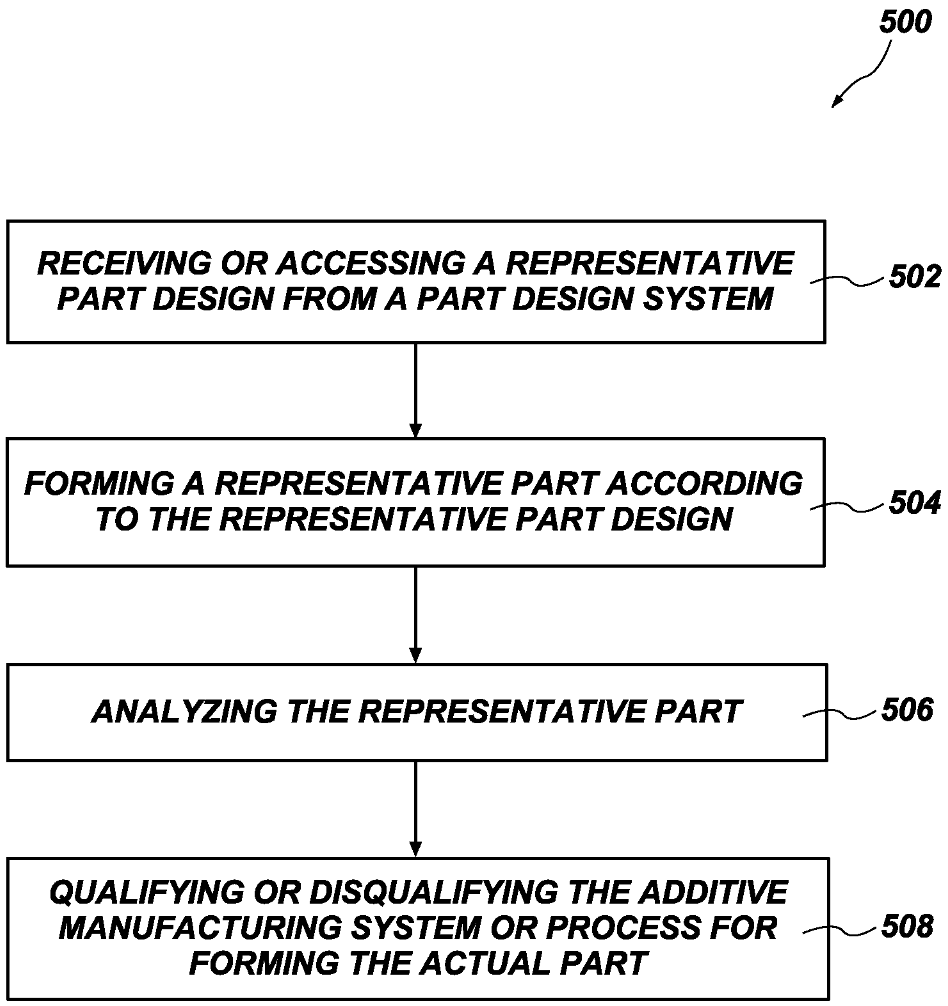
FIG. 5 is a flow chart of a method of qualifying an additive manufacturing system or process for forming an actual part.

FIG. 5 is a flow chart of a method 500 of qualifying an additive manufacturing system or process for forming an actual part. In some embodiments, the method 200 may include receiving or accessing a representative part design, as shown in act 502 of FIG. 5. For instance, an additive manufacturing system (e.g., additive manufacturing system 400) may receive a representative part design from a part design system (e.g., part design system). Furthermore, the representative part design may include any of the representative parts designs described herein and may be generated via any of the manners described herein.

Additionally, the method 500 may include forming a representative part according to the representative part design, as shown in act 504 of FIG. 5. For example, the additive manufacturing system may form the representative part through a respective additive manufacturing process (e.g., an additive manufacturing process desired to be qualified). For instance, the additive manufacturing system may form the representative part through any conventional additive manufacturing process.

Responsive to forming the representative part, the method 500 may include analyzing the representative part, as shown in act 506 of FIG. 5. For example, the representative part may be analyzed to determine (e.g., ascertain) a quality (e.g., accuracy, resolution, integrity, number or severity of defects) of the build of the representative part. As a non-limiting example, determining the quality of the representative part may include determining whether or not the quality of the representative part meets a threshold quality. In some embodiments, analyzing the representative part may include comparing the dimensions and shape of the representative part to the dimensions and shape of the representative part design. In further embodiments, analyzing the representative part may include comparing the representative part to another representative part formed (e.g., printed) via another additive manufacturing system that has previously been qualified to build the representative part. The representative part may be analyzed (e.g., inspecting) via any conventional manner (e.g., visual inspection, CT system, X-ray, penetration testing, infrared thermography, leak or pressure testing, eddy current, mechanical property inspection for measuring tensile, yield, shear, and/or fatigue, metallography, harness test, etc.) In some embodiments, the representative part may be analyzed to determine mechanical properties of different portions of the representative part. For example, the design elements of the representative part may be analyzed to determine the mechanical properties of the design elements. As a non-limited example, a relatively smaller element of design elements may cool faster during formation, which may affect the internal mechanical properties of the smaller element such that the internal mechanical properties of the smaller element are different relative to a larger element or core of the representative part.

As used herein, the terms “qualified,” “qualification,” and “qualify,” when used in relation to an additive manufacturing system and/or process, relates to whether or not the additive manufacturing system or process has been verified to produce an actual part of sufficient quality (e.g., meeting a threshold quality). For example, when an additive manufacturing system and/or process has been qualified to build the actual part, the additive manufacturing system and/or process has been verified to produce a representative part of sufficient quality. For instance, if the additive manufacturing system and/or process builds the design elements of the representative part at a sufficient quality, the additive manufacturing system and/or process may be considered to build the actual part at a sufficient quality.

Additionally, analyzing the representative part may include identifying one or more portions of the representative part where the additive manufacturing system and/or process failed to meet the threshold quality. For example, analyzing the representative part may include identifying where the additive manufacturing system and/or process broke down in forming the representative part according to the threshold quality. As a non-limiting example, analyzing the representative part may include determining additive manufacturing system and/or process was capable of forming features and elements down to a certain resolution (e.g., down to features have about 2 mm dimensions) but was unable to form features and elements having 1 mm or smaller dimensions according to the threshold quality. In view of the foregoing, analyzing the representative part may include determining quantification ranges (e.g., determining boundaries of ranges) within which the additive manufacturing system and/or process is capable of forming parts according to the threshold quality. The quantification ranges may include a range of heights, a range of curvatures, a range of elements sizes, a range of resolutions, etc. Put another way, analyzing the representative part may include determining that the additive manufacturing system and/or process is capable of forming the design elements until a certain point (e.g., until a certain height, until a certain curvature, until a certain size, until a certain resolution). For example, analyzing the representative part may include determining the extent of the additive manufacturing system's and/or process's capabilities in forming ever more complex geometries based on a current calibration of the additive manufacturing system and/or process.

Responsive to analyzing the representative part, the method 500 may include qualifying or disqualifying the additive manufacturing system or process for forming the actual part, as shown in act 508 of FIG. 5. For example, if the representative part formed via the additive manufacturing system or process is determined to meet the threshold quality, the method 500 includes qualifying the additive manufacturing system or process for forming the actual part. Conversely, if the representative part formed via the additive manufacturing system or process is determined to not meet the threshold quality, the method 500 includes disqualifying the additive manufacturing system or process for forming the actual part or providing an indication that further testing, adjustment, or analysis is requisite.

In some embodiments, the method 500 may include adjusting a calibration of the additive manufacturing system or process based on the analyses of the representative part.

Furthermore, responsive to qualifying the additive manufacturing system or process for forming the actual part, the method 500 may include forming the actual part via the additive manufacturing system or process. For example, the actual part may be formed via any of the additive manufacturing systems or processes described herein.

Referring to FIGS. 1-5 together, qualifying additive manufacturing systems and processes via the methods described herein may be advantageous. For instance, qualifying additive manufacturing systems and processes by forming and analyzing the representative part instead of the actual part may result in qualifying or disqualifying additive manufacturing systems and processes relatively more quickly than qualifying additive manufacturing systems and processes by forming and analyzing the actual part. For example, forming the representative part instead of the actual part requires less time and material, which reduces lead time and costs.

Figure 6:
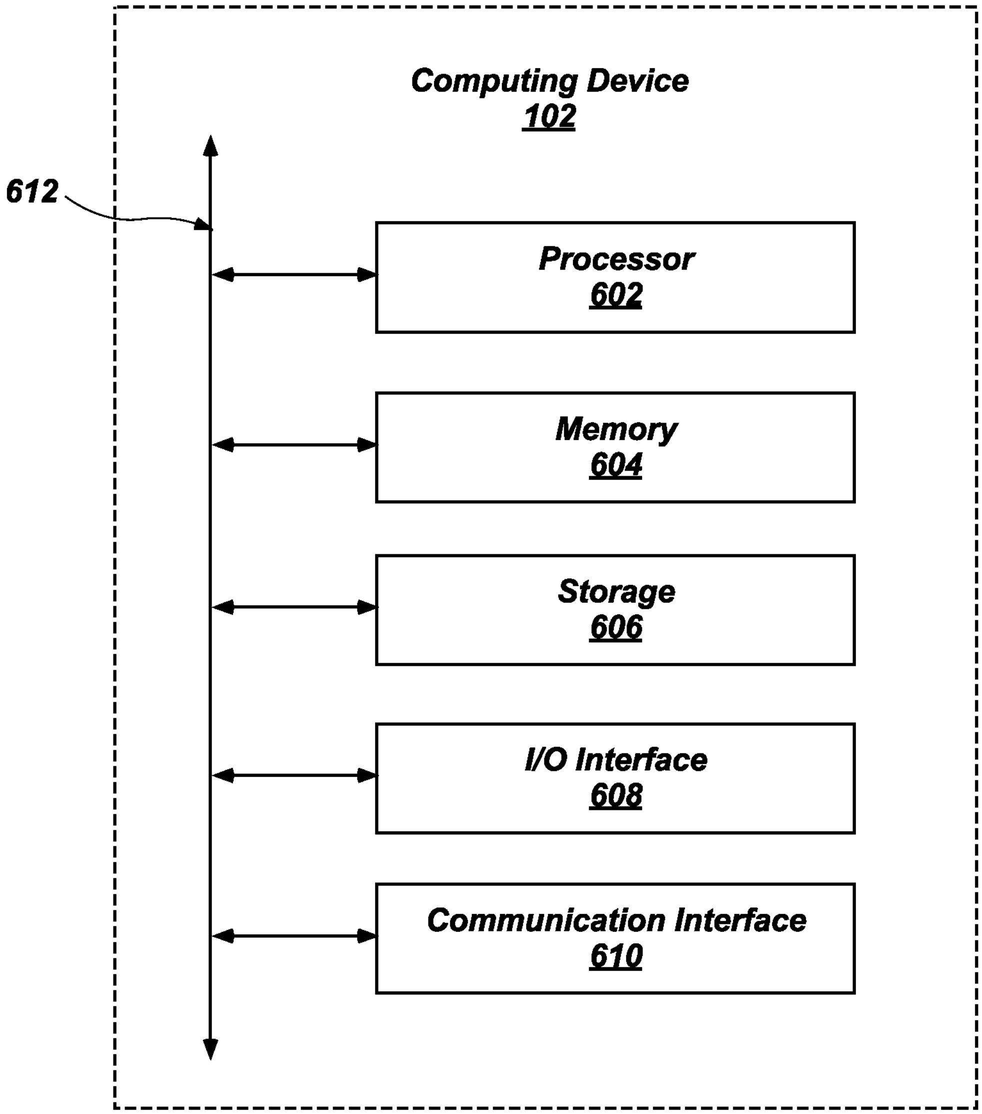
FIG. 6 is schematic diagram of a part design system according to one or more embodiments of the present disclosure.

FIG. 6 is a block diagram of a part design system 102. One will appreciate that one or more computing devices may implement the part design system 102. The part design system 102 can comprise a processor 602, a memory 604, a storage device 606, an I/O interface 608, and a communication interface 610, which may be communicatively coupled by way of a communication infrastructure. While an example of a computing device is shown in FIG. 6, the components illustrated in FIG. 6 are not intended to be limiting. Additional or alternative components may be used in other embodiments. Furthermore, in certain embodiments, the part design system 102 can include fewer components than those shown in FIG. 6. Components of the part design system 102 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (“TLBs”). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory (“RAM”), Read Only Memory (“ROM”), a solid state disk (“SSD”), Flash, Phase Change Memory (“PCM”), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive ("HDD"), a floppy disk drive, flash memory, an optical disc, a magneto-optical disc, magnetic tape, or a Universal Serial Bus ("USB") drive or a combination of two or more of these. The storage device 606 may include removable or non-removable (or fixed) media, where appropriate. The storage device 606 may be internal or external to the part design system 102. In one or more embodiments, the storage device 606 is non-volatile, solid-state memory. In other embodiments, the storage device 606 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 608 allows a user to provide input to, receive output from, and otherwise transfer data to and receive data from part design system 102. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the part design system 102 and one or more other computing devices or networks. As an example and not by way of limitation, the communication interface 610 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 610 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 610 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the part design system 102 to each other. As an example and not by way of limitation, the communication infrastructure 612 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 7A:
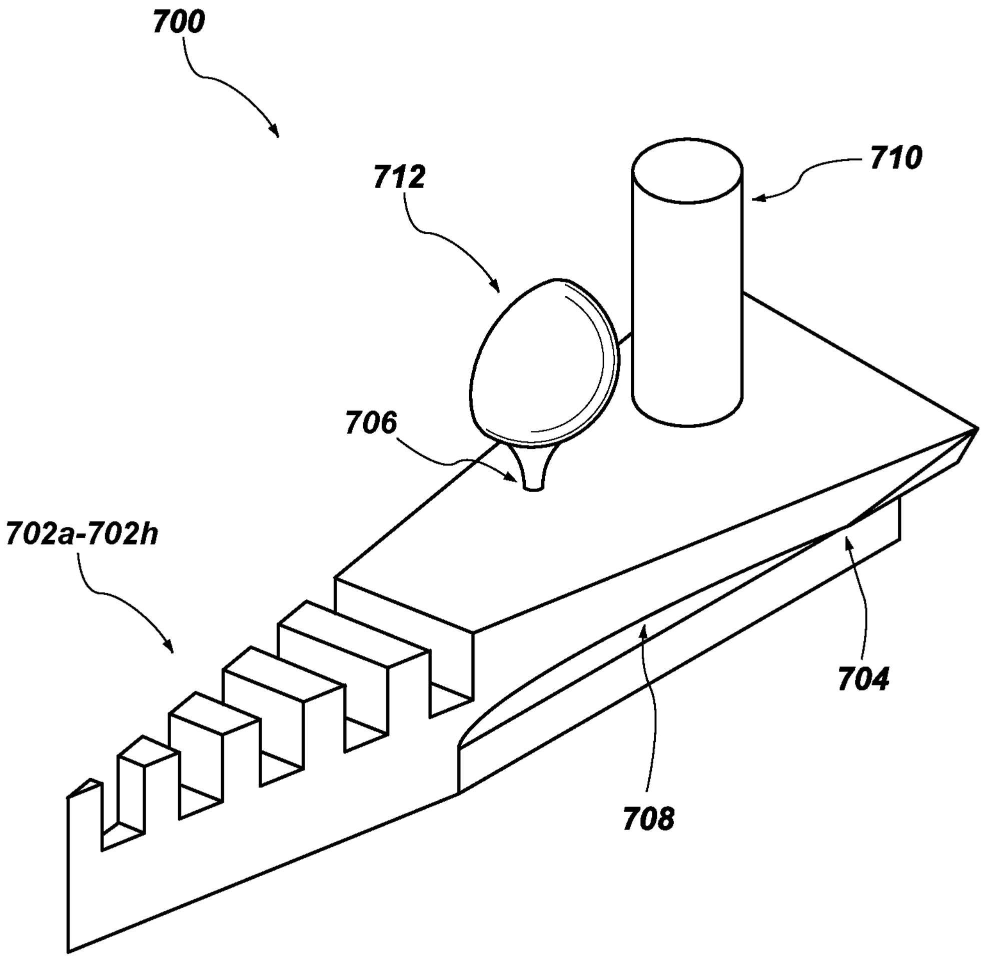
FIGS. 7A-7D depict various views of an example representative part design that may be designed by a part design system according to one or more embodiments of the present disclosure.
Figure 7B:
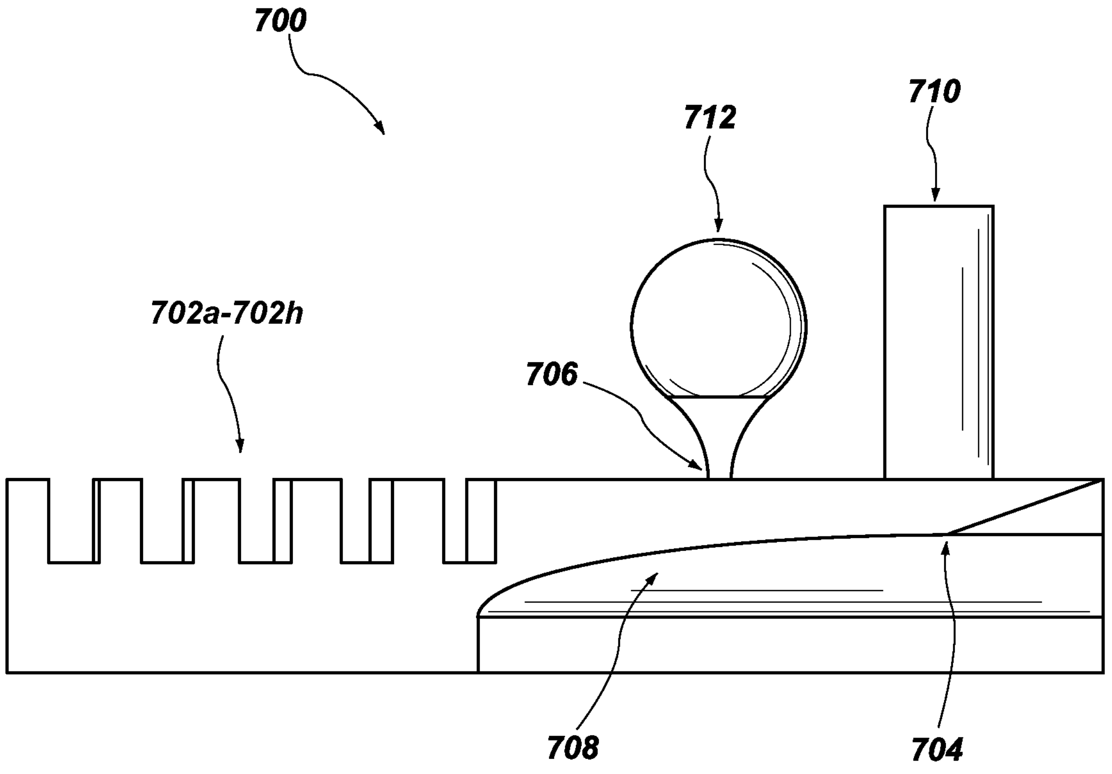
Figure 7C:
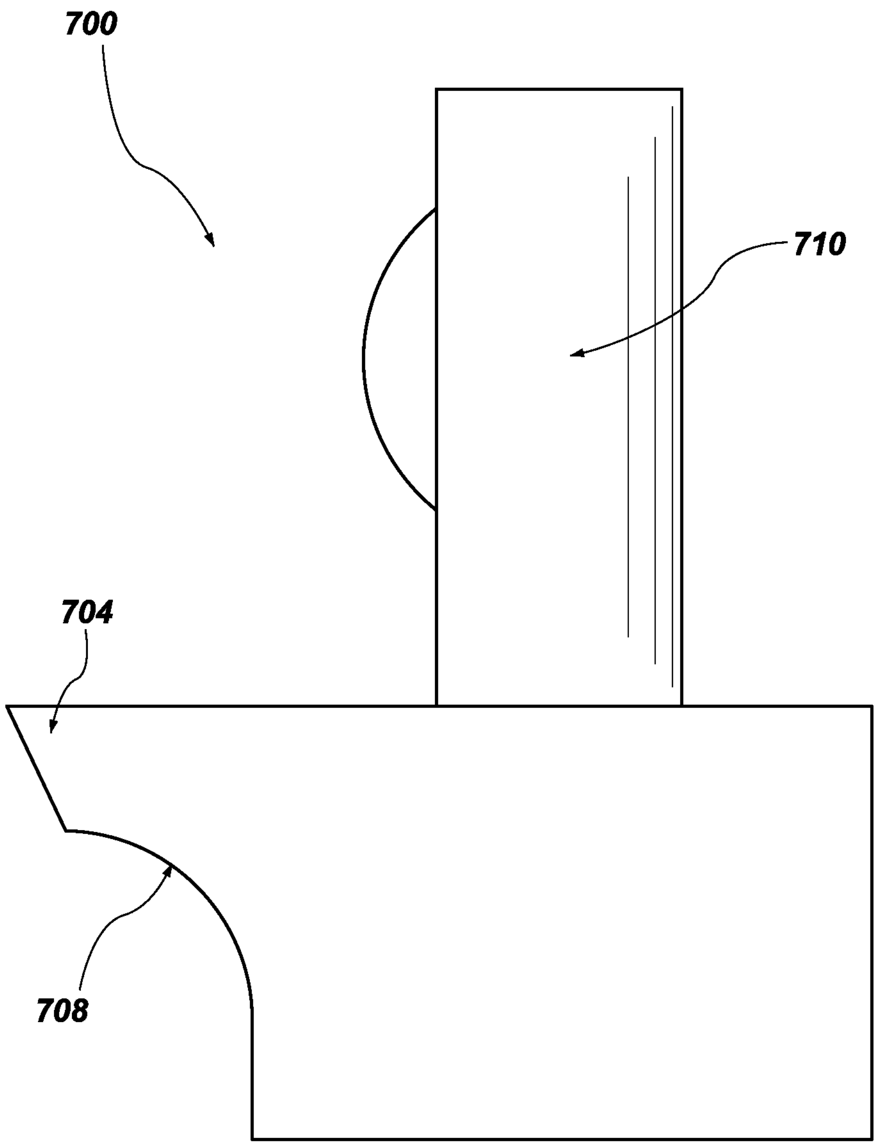
Figure 7D:
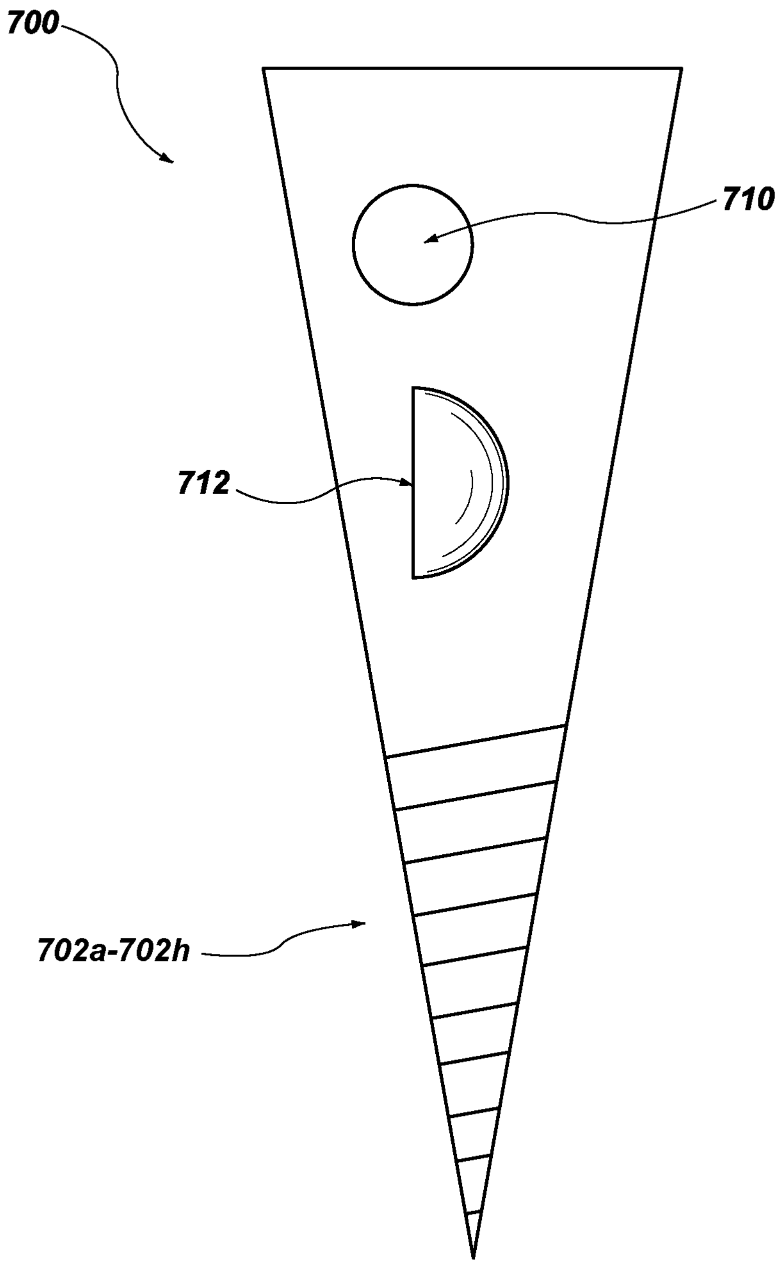

FIGS. 7A-7D depict various views of an example representative part design 700 that may be designed by the part design system 102 as described herein. For example, FIG. 7A shows a perspective view of a representative part design 700. FIG. 7B shows a side view of a representative part design 700, FIG. 7C shows a front view of the representative part design 700, and FIG. 7D shows a top view of the representative part design 700. Referring to FIGS. 2 and 7A-7D together, the representative part design 700 may include one or more design elements of one or more actual part designs. For example, the representative part design 700 may include one or more of a thinnest section or portion, a thickest section or portion, a maximum curvature, a maximum overhang angle, a sharpest section or portion, lattice structures, or a smallest feature or portion of one or more actual part designs (and actual parts). As a non-limiting example, the representative part design 700 of FIGS. 7A-7D includes the smallest features 702*a*-702*h* of one or more actual part designs, an overhang portion 704 of the one or more actual part designs, a thinnest portion 706 of the one or more actual part designs, a maximum overhang angle 708 of the one or more actual part designs, a tower 710 reaching a maximum height of the one or more actual part designs, and lattice structures 712 of the one or more actual part designs.

Figure 8B:
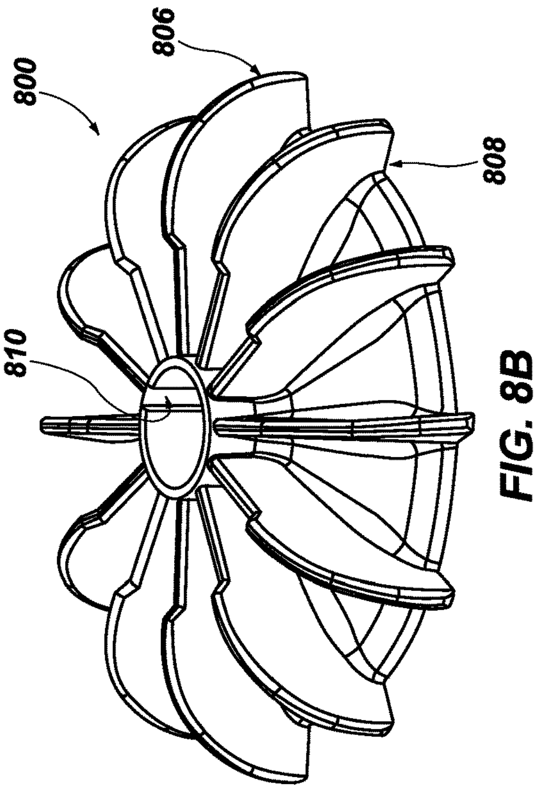
FIGS. 8A-8E depict various views of an example actual part design according to one or more embodiments of the present disclosure.
Figure 8E:
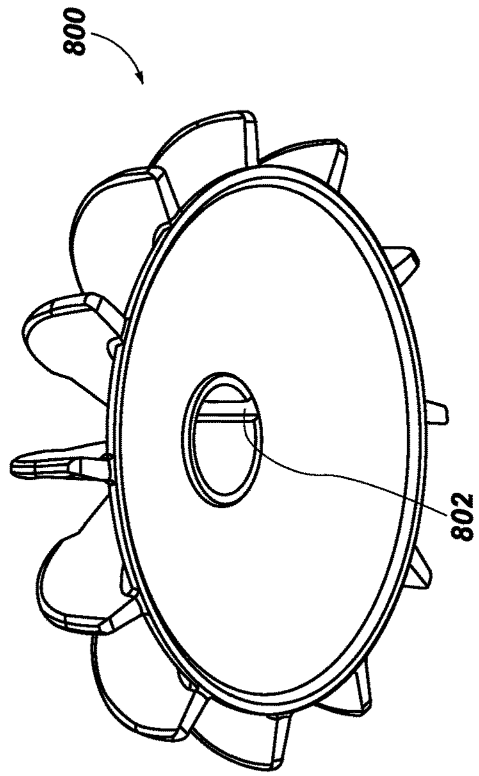
Figure 8A:
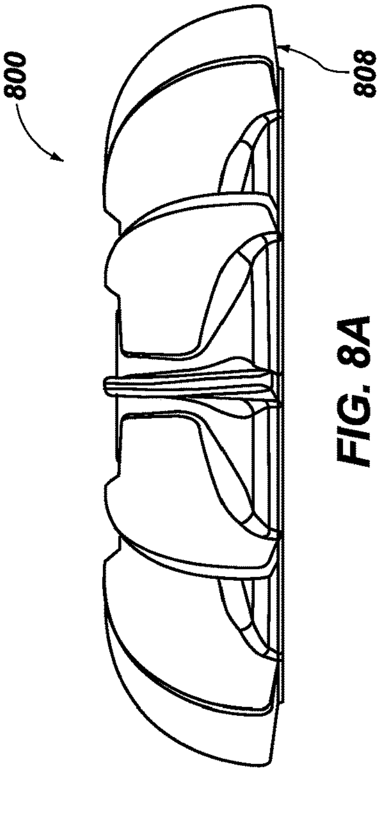
Figure 8D:
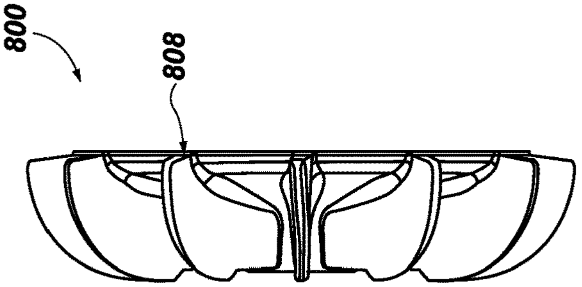
Figure 8C:
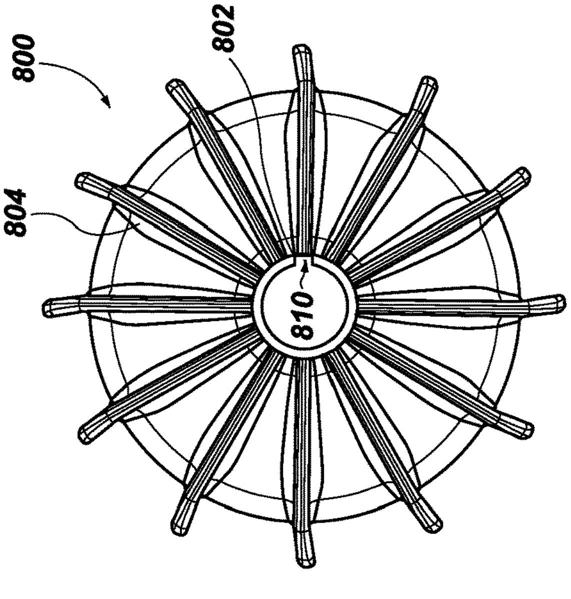

FIGS. 8A-8E depict various views of an example actual part design 800 according to one or more embodiments of the present disclosure. For example, FIG. 8A depicts a side view of the actual part design 800. FIG. 8B depicts a top perspective view of the actual part design 800. FIG. 8C depicts a top view of the actual part design 800. FIG. 8D depicts another side view of the actual part design 800. FIG. 8E depicts a bottom perspective view of the actual part design 800. Referring to FIGS. 8A-8E together, the actual part design 800 may include one or more design elements. For example, the actual part design 800 may include at least a thinnest section or portion 802, a thickest section or portion 804, a maximum curvature 806, a maximum overhang angle 808, and a sharpest section or portion 810.

FIGS. 9A-9C include charts 902, 904, 906 of results of analysis of an actual part design (e.g., actual part design 800) according to one or more embodiments. The analysis of the actual part design may include any of the analyses described herein and may include identifying the design elements of the actual part design via any of the manner described herein.

Figure 10B:
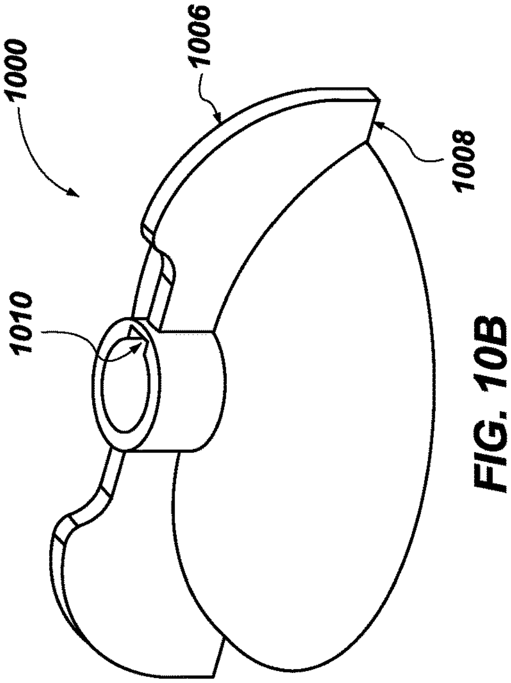
FIGS. 10A-10E depict various view of an example representative part design generated based on the actual part design of FIGS. 8A-8E.
Figure 10E:
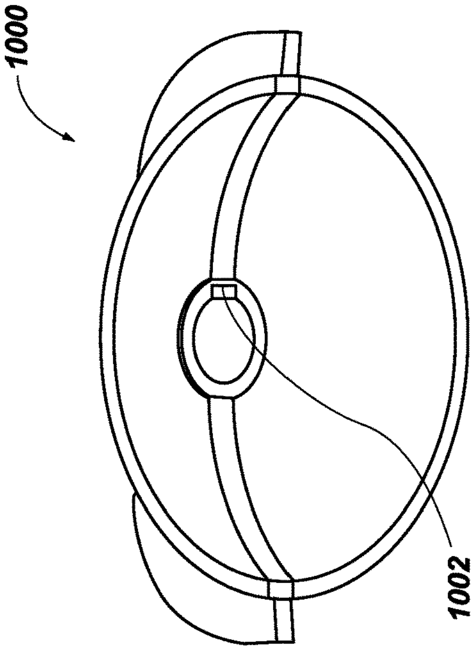
Figure 10A:
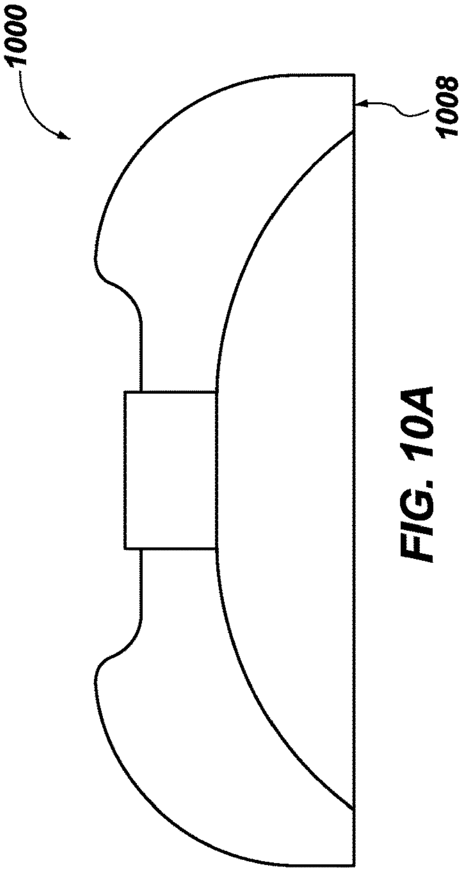
Figure 10D:
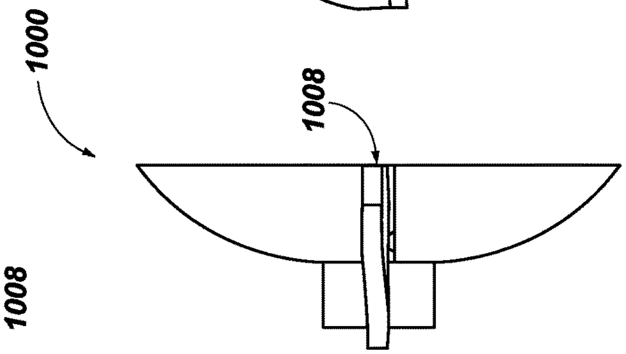
Figure 10C:
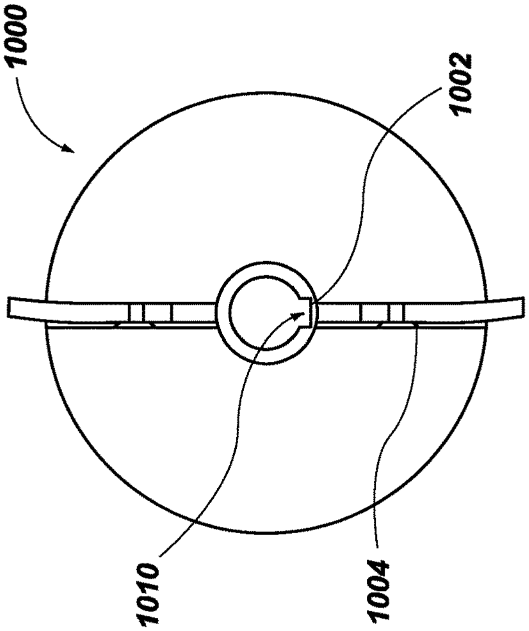

FIGS. 10A-10E depict various views of a representative part design 1000 according to one or more embodiments of the present disclosure. For example, FIG. 10A depicts a side view of the representative part design 1000. FIG. 10B depicts a top perspective view of the representative part design 1000. FIG. 10C depicts a top view of the representative part design 1000. FIG. 10D depicts another side view of the representative part design 1000. FIG. 10E depicts a bottom perspective view of the representative part design 1000. Referring to FIGS. 10A-10E together, the representative part design 1000 may be based on the actual part design 800 of FIGS. 8A-8E. Furthermore, the representative part design 1000 may include one or more design elements identified from the actual part design 800. For example, the representative part design 1000 may include at least a thinnest section or portion 1002 correlating to the thinnest section or portion 802 of the actual part design 800, a thickest section or portion 1004 correlating to the thickest section or portion 804 of the actual part design 800, a maximum curvature 1006 correlating to the maximum curvature 806 of the actual part design 800, a maximum overhang angle 1008 correlating to the maximum overhang angle 808 of the actual part design 800, and a sharpest section or portion 1010 correlating to the sharpest section or portion 810 of the actual part design 800.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method of forming a representative part correlating to an actual part, the method comprising:
- receiving an actual part design;
- analyzing via machine learning the actual part design to identify two or more design elements, the two or more design elements comprising:
  - a portion of the actual part;
  - a portion of a geometry of the actual part; or
  - a size of a portion of the actual part;
- based on the two or more design elements, generating a representative part design incorporating the two or more design elements and having a differing overall shape comparative to the actual part design; and
- forming via one or more additive manufacturing processes a representative part based on representative part design.

2. The method of claim 1, wherein the actual part design comprises a three-dimensional model.

3. The method of claim 1, wherein generating the representative part design comprises generating the representative part design utilizing machine learning.

4. The method of claim 3, wherein the machine learning comprise one or more of quadratic regression analysis, logistic regression analysis, support vector machines, Gaussian process regression, ensemble models, decision tree learning, regression trees, boosted trees, gradient boosted trees, multilayer perceptron, one-vs-rest, Naïve Bayes, k-nearest neighbor, association rule learning, neural networks, deep learning, or pattern recognition.

5. The method of claim 1, wherein identifying the two or more design elements comprises identifying two or more of a thinnest structural section, a thickest structural section, a maximum curvature of a portion, a maximum overhang angle, a sharpest section, or a smallest feature exhibited in the actual part design.

6. The method of claim 1, wherein the one or more additive manufacturing processes comprises one or more of binder jetting, stereolithography (SLA), sol-gel or liquid dispense methods, inkjet 3D printing, direct metal deposition, micro-plasma powder deposition, direct laser sintering, selective laser sintering, electron beam melting, or electron beam freeform fabrication.

7. The method of claim 1, further comprising subjecting the representative part to testing.

8. The method of claim 7, further comprising simulating performance of the representative part.

9. The method of claim 8, further comprising, based at least partially on one or more of the testing or the simulation of the representative part, adjusting the actual part design.

10. A system for forming a representative part correlating to an actual part, the system comprising:
- a controller including one or more processors, the processors including hardware for executing instructions, and memory configured for storing data, the data including programs for execution by the one or more processors; and
- an additive manufacturing system coupled with the controller, the additive manufacturing system configured to form a representative part based on instructions from the controller, the representative part comprising:
  - two or more design elements of the actual part, the two or more design elements of the representative part are oriented differently relative to each other in comparison to an orientation of two correlating design elements of the actual part; and
  - a different overall shape relative to the actual part.

11. The system of claim 10, wherein the two or more design elements comprises two or more of a thinnest structural section, a thickest structural section, a maximum curvature of a portion, a maximum overhang angle, a sharpest section, or a smallest feature exhibited in the actual part.

12. The system of claim 10, wherein the representative part has a smaller overall size in comparison to an overall size of the actual part.

13. The system of claim 10, wherein the representative part comprises all of the design elements of the actual part.

14. The system of claim 10, wherein each of the design elements of the representative part comprises a same material as a correlating design element of the actual part.

15. A method of qualifying an additive manufacturing system or process for forming an actual part, the method comprising:
- forming a representative part based on a representative part design via the additive manufacturing system or process, the representative part design incorporating one or more design elements of the actual part and having a differing overall shape comparative to the actual part;

analyzing the representative part to determine a quality of the representative part;

responsive to determining that the quality of the representative part meets a threshold quality, qualifying the additive manufacturing system or process for forming the actual part; and responsive to determining that the quality of the representative part does not meet a threshold quality, disqualifying the additive manufacturing system or process for forming the actual part.

16. The method of claim 15, wherein analyzing the representative part comprises analyzing the representative part via one or more of visual inspection, CT scans, X-rays, penetration testing, infrared thermography, leak or pressure testing, eddy currents, mechanical property inspection for measuring tensile, yield, or shear, fatigue testing, metallography testing, or harness testing.

17. The method of claim 15, further comprising forming the actual part via the additive manufacturing system or process.

18. The method of claim 15, wherein analyzing the representative part comprises determining portion of the representative part where the additive manufacturing system or process failed to meet the threshold quality.

19. The method of claim 17, further comprising, based at least partially of the determined portion of the representative part where the additive manufacturing system or process failed to meet the threshold quality, calibrating the additive manufacturing system or process.

20. The method of claim 15, wherein analyzing the representative part to determine quality of the representative part comprises comparing the representative part to an additional representative part formed via a different additive manufacturing system.

21. The method of claim 20, wherein the different additive manufacturing system has been previously qualified to build the additional representative part.

22. A method of forming a universal representative part, the method comprising:

receiving a plurality of actual part designs;

analyzing via machine learning the plurality of actual part designs to identify design elements of the plurality of actual part designs, the design elements comprising:

a portion of the actual part;

a portion of geometry of the actual part; or a size of a portion of the actual part;

based on the identified design elements, generating a universal representative part design incorporating all of the identified design elements; and forming via one or more additive manufacturing processes a universal representative part based on universal representative part design.

23. The method of claim 22, wherein generating the universal representative part design comprises generating the universal representative part design utilizing machine learning.

* * * * *